United States Patent
Killpatrick

(10) Patent No.: US 7,088,452 B2
(45) Date of Patent: Aug. 8, 2006

(54) DITHER STRIPPER WITH NON-LINEARITY CORRECTION

(75) Inventor: Joseph E. Killpatrick, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 334 days.

(21) Appl. No.: 10/412,022

(22) Filed: Apr. 11, 2003

(65) Prior Publication Data

US 2004/0201851 A1    Oct. 14, 2004

(51) Int. Cl.
   *G01C 19/68* (2006.01)

(52) U.S. Cl. .................................... 356/475

(58) Field of Classification Search ............... 356/472, 356/474, 475, 476

See application file for complete search history.

(56) References Cited

U.S. PATENT DOCUMENTS

| | | |
|---|---|---|
| 3,373,650 A | 3/1968 | Killpatrick |
| 4,248,534 A | 2/1981 | Elbert |
| 4,344,706 A | 8/1982 | Ljung et al. |
| 4,610,543 A | 9/1986 | Ferriss |
| 4,751,718 A | 6/1988 | Hanse et al. |
| 5,048,963 A | 9/1991 | Ignagni |
| 5,249,031 A | 9/1993 | Fritze et al. |
| 5,486,920 A | 1/1996 | Killpatrick et al. |
| 6,208,414 B1 | 3/2001 | Killpatrick et al. |

OTHER PUBLICATIONS

Killpatrick, Joe, The Digital Laser Gyro, Scientific Honeyweller, Sensors Issue pp. 80-97 (1996).

*Primary Examiner*—Samuel A. Turner
(74) *Attorney, Agent, or Firm*—Dina Khaled, Esq.; Armstrong Teasdale LLP

(57) ABSTRACT

A method and apparatus for correction of laser gyro dither pickoff signals. Dither pickoff signals are sampled during the dither input signal cycle at points where error is more prevalent in the dither pickoff signal. The samples are then used to modify correction factors used in the calculation of a corrected dither pickoff signal.

6 Claims, 8 Drawing Sheets

DITHER STRIPPER WITH NON-LINEARITY CORRECTION

TECHNICAL FIELD

This invention relates generally to a method and apparatus for removing the dither signal component from the inertial output of a laser gyro and more particularly to a method and apparatus for dither stripper gain correction.

BACKGROUND OF THE INVENTION

Ring laser angular rate sensors, also called laser gyros, are well known in the art. One example of a ring laser angular rate sensor is U.S. Pat. No. 4,751,718 issued to Hanse et al. Present day ring laser angular rate sensors include a thermally and mechanically stable laser block having a plurality of formed cavities for enclosing a gap. Mirrors are placed at the extremities of the cavities for reflecting laser beams and providing an optical closed-loop path.

Associated with such sensors is an undesirable phenomenon called lock-in which has been recognized for some time in the prior art. During lock-in the counter-propagating laser beams tend to lock together to a common frequency. To avoid or reduce the effects of lock-in, the ring laser gyro may be biased by an alternating bias technique such as that shown and described in U.S. Pat. No. 3,373,650 issued in the name of J. E. Killpatrick. The alternating bias technique is usually referred to as dithering, and may be implemented by a variety of ways including electro-optical and mechanical schemes. Since dithering, by either of these mentioned techniques and the like, directly affects the behavior of the counter-propagating laser beams, the sensor readout signal will contain not only inertial rate information, but will also contain a signal component directly related to the dithering, or alternating bias, of the sensor.

Dither motors of the prior art usually have a suspension system which includes, for example, an outer rim, a central hub member and a plurality of three dither motor reeds which project radially from the hub member and are connected between the hub member and the rim. Conventionally, a set of piezo-electric elements is connected to the suspension system. The set of piezo-electric elements serves as an actuator. When actuated through the application of an electrical signal to the piezo-electric elements, the suspension system operates as a dither motor which causes the block of the sensor to oscillate angularly at the natural mechanical resonant frequency of the suspension system. This dither motion is superimposed upon the inertial rotation of the sensor in inertial space. Such dither motors may be used in connection with a single laser gyro, or to dither multiple laser gyros. The prior art includes various approaches to recover inertial rotation data free from dither effects.

In situations where the gyro is mounted to an inertial platform or mounting base, and mechanical dithering is applied, the gyro output comprises the sum of the base angular motion and the gyro dither motion relative to the mounting base. This is true whether the sensor readout is mounted directly on the sensor, as in the case of a laser block mounted sensor readout, or fixed relative to the sensor mounting base like that shown in the aforementioned patent.

The signal contribution in the sensor readout signal due to the alternating bias is herein referred to as the dither signal component. For low noise navigational systems, the dither signal component in the readout signal generally needs to be minimized or removed to avoid control problems, particularly in block mounted readout systems.

Prior art solutions to remove the dither signal component include notch filters and fast Fourier transforms. However, such techniques generate gain and phase shift disturbances that can affect the stability of any control loops or any readout signal processing systems. Another solution utilizes a digital pulse subtraction technique as taught in U.S. Pat. No. 4,248,534, issued to Elbert. A desirable solution is to remove the dither signal component by generating a correction signal which is substantially equivalent to the dither signal component. This latter approach is taught in U.S. Pat. No. 4,344,706 issued to Ljung et al. Ljung et al. teaches the use of a tracking circuit for tracking the clockwise and counterclockwise components of dither rotation. These dither components are subtracted from the usual readout signal which is responsive to the counter-propagating laser beams of the sensor thereby providing a corrected readout signal.

Another technique is to strip the dither signal component by an electronic dither compensator as taught in U.S. Pat. No. 4,610,543 issued to Ferriss. This patent illustrates an up/down count technique for a ring laser gyro readout mechanization in which readout output counts due to dither are subtracted from the readout output count in order to provide a corrected readout count.

The Ferriss patent also shows a closed-loop feedback method of reducing the dither component in the system readout signal. In Ferriss, a dither correction signal is subtracted from the gyro readout signal to derive a corrected sensor output signal. Closed loop correction is provided by generating the dither correction signal as a function of a dither reference signal representative of the dithering or alternating bias, and the relationship between the correction signal and the dither reference signal is controlled as a function of any dither signal component in the corrected sensor output signal.

Referring now to prior art FIG. 1, thereshown is a ring laser gyro like that shown in the aforementioned patents. Gyro 10 includes laser block 12 which provides the supporting structure for a propagation path for counter-propagating laser beams.

Sensor 10 includes a dither mechanization (not shown) responsive to a dither drive signal 14, generally sinusoidal, for providing the dither or alternating bias as previously described. For example, block 10 may be rotationally oscillated, as shown in the aforementioned patents. A dither spring (not shown) having piezo-electric devices attached thereto can operate in response to dither drive signal to cause the spring to flex and cause block 12 to rotationally oscillate relative to a mounting base (not shown), commonly referred to as the inertial platform. Furthermore, a piezo-electric device may also be attached to the spring for providing a dither reference signal, identified as signal "D(t)", on signal line 19, having signal characteristics directly related to the actual dither motion of the sensor.

The just mentioned piezo-electric output signal "D(t)" is sometimes referred to as the "dither pick-off signal". Signal D(t) may be either rotation angle or rate dependent upon the output circuitry which is driven by the piezo-electric pick-off, but herein is preferably indicative of sensor block rotation angle relative to the mounting base. The dither reference signal may be obtained by a variety of techniques depending upon the dither scheme that is selected (i.e. optical or mechanical).

A readout assembly 11 is mounted to laser block 12 and includes a means for combining a portion of the counter-propagating laser beams to provide an interference fringe pattern in a well known manner. Readout assembly 11 also includes a pair of photo detectors (not shown) for providing output signals on signal lines 13 and 15 which are out of phase with each other, generally in phase quadrature. These signals are processed by a signal decoder 20 which in turn provides pulses on either signal line 21 indicating a clockwise rotation, or pulses on signal line 23 indicating counterclockwise rotation of sensor 10. These latter mentioned pulses are accumulated in pulse accumulator 30 which provides an output signal S representative of the rotation angle of sensor 10.

Alternatively, decoder 20 may also be constructed to provide output pulses indicative of incremental rotation angle change and also a separate direction signal indicator. In turn a single counter may then be controlled up or down dependent upon the output of the direction indicator. These signals in turn may then be signal processed to provide gyro angular rate, and/or angular rotation information, either accumulated or incremental.

Herein, signal S is the digital representation of the rotation of sensor 10 directly derived from the sensor output, namely the gyro readout interference fringes. It should be understood that either mechanical or optical dithering of the counter propagating laser beams directly affects the number and rate of fringes which pass the readout photodetectors and so directly affects readout signal S. Therefore, if the sensor is dithered in any manner as already described, then signal S will include a dither signal component.

To improve the output signal, U.S. Pat. No. 5,048,963 (Ignani) teaches a digital processing technique to remove the dither signal. In FIG. 2, the Ignani technique is shown. In the following exposition, the subscript "a" will be used to indicate an angle of rotation, and the subscript "r" will be used to indicate angular rate.

The dither signal component stripper in accordance with the present invention is illustrated in the block diagram as illustrated in FIG. 2. FIG. 2 shows in further detail a dither drive system block diagram for rotationally oscillating the gyro block 12 as illustrated in FIG. 1. Specifically, a dither spring 202 imparts rotational motion to gyro block 12. The dither spring 202 is mechanically driven by a piezo-electric driver transducer 204. At the same time a piezo-electric readout transducer 206 provides an analog output signal $D_a(t)$ representative of an analog measurement of the angle of rotation of the gyro block 12 relative to the mounting base. In turn, the dither reference signal $D_a(t)$ is presented as a feedback input to driver circuit 208 which provides the control input to piezo-electric driver 204. The aforementioned system is intended to oscillate the gyro block 12 relative to the mounting base by a rotation rate identified as $B_r$, and at the same time the mounting base is rotated by the inertial input rate I r to be measured.

The gyro readout 11 will therefore produce an output signal from readout 11 on signal line 210 representative of the sum Of $I_r$ and $B_r$, i.e., the rotation rate $G_r$ seen by gyro 10. In turn, gyro readout signal processor 220 will provide an output signal S(n) on signal line 222 representative of the angular rotation rate or angle of gyro 10 during the last sample period "n" as will be more fully described.

Signal line 222 is presented as one input to circuit means 225 for providing an output signal $G_c(n)$ representative of the signal S(n) less an incremental correction signal C(n) provided on signal line 255 by signal processor 250.

In accordance with the present invention, the dither reference signal $D_a(t)$, representative of the angle of dither rotation, is measured by a circuit means 260. In turn, analog signal $D_a(t)$ is sampled and stored by sample storage means 262 and 264, respectively. Sample/storage means 262 provides a digital signal $D_a(n)$ representative of signal $D_a(t)$ at sample time "n" under control of synchronizing clock 270. By way of example, sample/storage means 262 and 264 may be provided by simple analog or digital sample and hold circuits or the like to provide the intended function.

Signal $D_a(n)$ is presented to signal processor 250 for operating on at least the current values $D_a(n)$ and $D_r(n)$ to derive a correction signal C(n) in a manner as will now be described.

The gyro output rotation angle $G_a$ may be described by:

$$G_a = I_a + B_a \tag{1}$$

where:
$G_a$=gyro rotation angle output relative to the inertial frame,
$I_a$=inertial rotation angle of mounting base relative to an inertial frame, and
$B_a$=dither rotation angle of the gyro block relative to the mounting base.

The true dither rotation angle of block B may be expressed as a function of the measured dither angle obtained from the piezo-electric readout:

$$B_a(t) = k_1 * D_a(t) + k_2 * D_r(t) \tag{2}$$

where:
$k_1$ and $k_2$ reflect the characteristics of the means or measuring technique to produce the dither reference signal. For example, $k_1$ and $k_2$ may reflect the piezo-electric element characteristics for a PZT dither pick off of a rotationally dithered gyro.

Assuming that constants $k_1$ and $k_2$ are known, and using equations (1) and (2), the corrected gyro output can be expressed as:

$$G_c(n) = S(n) - k_1[(D_a(n) - D_a(n-1)] \tag{3}$$

where:
S(n)=incremental gyro rotation change derived from the gyro readout output change over the $n^{th}$ computational interval,
$G_c(n)$=incremental gyro output stripped of the dither component over the $n^{th}$ computational interval, and
$D_a(n)$=is the dither angle of the block relative to the mounting base at the $n^{th}$ computational interval.

The coefficients may be either chosen or may be determined by calibration using raw data. For example, the determination or calibration of the values $k_1$ and $k_2$ may be obtained by the application of the least-squares criterion or other algorithm based on the observed measurements of $G_c(n)$, S(n), $D_a(n)$, and $D_a(n)$. An example of the least-squares criterion to obtain $k_1$ and $k_2$ may be mathematically described as follows:

$$\begin{bmatrix} \sum_i \Delta \alpha_i^2 & \sum_i \Delta \alpha_i \Delta \alpha_i \\ \sum_i \Delta \alpha_i \Delta \alpha_i & \sum_i \Delta \alpha_i^2 \end{bmatrix} \begin{bmatrix} k_1 \\ k_2 \end{bmatrix} = \begin{bmatrix} \sum_i [\Delta \theta_i - \Delta \theta_d(i)] \Delta \alpha_i \\ \sum_i [\Delta \theta_i - \Delta \theta_d(i)] \Delta \alpha_i \end{bmatrix} \tag{4}$$

Where
"i" is the $i^{th}$ gyro of an inertial measurement unit (two or more gyros),
$\Delta \alpha_i = D_a(n) - D_a(n-1)$, and
$\Delta \alpha_i = D_r(n) - D_r(n-1)$, $\Delta\theta_i = S(n) - S(n-1)$, and $\Delta\theta_d$ = dither induced motion of the inertial platform.

Dither induced motion of the inertial platform may be derived from the vector equation:

$$\Delta\Theta_d = [J][\Delta\alpha] \qquad (5)$$

For three gyros, matrix [J] is a 3×3 constant matrix which describes the total system inertial distribution of mass, sometime referred to as the moment of inertial matrix, and [Δα] is vector consisting of a 3×1 matrix describing the dither angle charge of the three gyros.

The calibration operation can be multiplexed between three system gyros of an inertial measurement unit, given that the values of $k_1$ and $k_2$ vary slowly, as expected to be the case. A calibration time of a second or less should be adequate to calibrate a single gyro. When dither induced base motion is negligible, due to a very large ratio of mounting base inertia to gyro inertia, the term $\Delta\theta_d$ in (4) may be eliminated.

The piezo-calibration coefficients $k_1$ and $k_2$ may be determined in background or foreground. When done in foreground one can take advantage of the fact that the elements of the matrix on the left side of (4) vary slowly, and are a function only of the dither amplitude and frequency. Therefore, these summations need not be carried out over the same time interval as the two summations on the right side of (4). This allows increased efficiency in carrying out (4), in that two or possibly three stages may be defined for performing the complete set of computations required for the calibration of a single gyro. It is important only that the two summations on the right side of (4) be carried out concurrently, using the same sensor data for both summations.

However, the piezo readout, that produces a dither pickoff signal, is not linear for all mechanical inputs. Shown in prior art FIG. 3, is a dither input signal (301) and a dither pickoff signal (302). Note that the dither input signal trails in angle/time with respect to the input signal (noted here as Δθ) and that the peak (303) of the input signal is higher than the peak (304) of the pickoff signal (here called "offset").

The delay is due to propagation time for the dither input signal to drive the dither motor which in turn deforms the piezo sensors that create the dither pickoff signal. The offset is due to a non-linearity in the piezo sensors that produce the pickoff signal. In fact, the non-linearity grows with the cube of the input signal. In the past, samples of the dither pickoff signal were taken only every 90°, or four times per dither input signal cycle. While this produces good compensation coefficients for many purposes, it does not take into account the variations in the cubic non-linearities of the piezo sensor.

Referring now to FIG. 2A, thereshown is a prior art method of accomplishing phase error correction. The dither pickoff signal at block 205A is amplified in block 210A and then digitized using an A/D converter 215A. The digitized signal ($\alpha_d$) is then multiplied by the DSGAIN value at block 220A and divided by a constant (here 4000) at block 225A for scaling.

The output of block 225A is then summed with the upper 16 bits of the Sum0 value at block 235. The value of the Sum0 is a positive value at 0 crossings of the dither cycle while it is a negative value at 180° crossings due to inverter 235A.

The output of summer 230A is the Dither Angle. This value is stored in block 240A. Summer 245A subtracts the value of the Previous Dither Angle from the Dither angle to produce a Dither Angle Difference Value.

The Gyro Angle ($\theta_d$) is stored in block 250A. The previous Gyro Angle is subtracted from the current value at summer 255A and multiplied by ten at block 260 for scaling to produce a Gyro Angle Difference Value.

The Dither Angle Difference Value is then subtracted from the Gyro Angle Difference Value at block 265A to produce a Dither Stripped Gyro Difference Value. This is then multiplied by a scaling factor $K_{loop}$ at block 270A. $K_{loop}$, in the prior art, has been set to 300 for the first second following dither startup and then 10 thereafter to produce a Scaled Dither Stripped Gyro Difference Value.

The Scaled Dither Stripped Gyro Difference Value is then summed with the stored Sum0 value at summer 280A. Inverter 275A adds a positive value of the Scaled Dither Stripped Gyro Difference Value at the 0° 0 crossing of the dither cycle while a negative value of the Scaled Dither Stripped Gyro Difference Value is added at the 180° 0 crossing.

Correction of the Dither Gain error occurs in a similar manner to the phase correction and one prior art method for accomplishing this is shown in FIG. 2B. The dither pickoff signal from block 205B is amplified at block 210B and then summed with the opposite of the AutoZero Correction signal at summer 215B. The Corrected Dither Pickoff Signal is then digitized in A/D converter 220B and scaled in block 225B by 10 times the DSGAIN value (which is determined from the upper 16 bits of the Sum90 value in block 295B). This value is then divided by a constant (here 4000) for scaling at block 230B. The result is then added to the opposite of a non-linear correction value stored in block 235B at summer 240B. The non-linear correction value is equal to $$\frac{\left[b_3 \dfrac{DAmpCounts^3}{2^{22}} + b_2 \dfrac{DAmpCounts^2}{2^{12}}\right]}{2^{16}} \qquad (6)$$

where:

$b_2$ represents the square term of the error, $b_3$ represents the cubic term of the error, and DAmpCounts represents the value of the dither angle at each sample.

The output of summer 240B is the Current Dither Angle value, which is stored in block 245B. Summer 250B is used to subtract a Previous Dither Angle Value from the Current Dither Angle Value to provide a Dither Difference Value to summer 270B.

The other input to summer 270B is a Scaled Gyro Angle Difference Value. This value is generated by taking a Current Gyro Angle Value and subtracting the Previous Gyro Angle Value at summer 260B. The result is then scaled (hereby a factor of 10) at block 265B to produce the Scaled Gyro Angle Difference Value. This scaling forces all of the calculations to high resolution, so that rounding is effectively eliminated. At summer 270B, the Dither Difference Value is subtracted from the Scaled Gyro Angle Difference Value which is then scaled by $K_{loop}$ to produce the final scaling or offset value for this pass through the loop. Here, $K_{loop}$ is equal to 3000 for the first second following dither startup and 100 after the first second. The final offset value is then added to Sum90 amount.

While this method of reducing error gives good control on these terms, it does not compensate for the variations in the cubic or square compensation terms in the non-linearity of the piezo-electric transducer. Accordingly, while fixed values of $k_1$ and $k_2$ have been used in the past, these values in fact vary.

It is an object of the present invention to correct the dither pickoff signal and therefore the gyro output signal to account for the non-linearities in cubic terms of the $\Delta\theta$ and the offset.

SUMMARY OF THE INVENTION

The present invention is a method and device for improving the quality of the dither pickoff signal for correction of a laser gyro. The dither pickoff signal is monitored at more points throughout the dither cycle. Instead of merely monitoring the dither pickoff signal at four points of the cycle (0°, 90°, 180° and 270°), the dither pickoff signal is sampled at eight points in the cycle, preferably at 0°, 45°, 90°, 135°, 180°, 225°, 270° and 315°. The pickoff signal at the additional times during the cycle provides additional information about the phase, DSGAIN and non-linearity values contained in the dither pickoff signal. This information is then used to calculate new values for $k_1$ and $k_2$ as dither pickoff signal correction factors. Use of the new values for $k_1$ and $k_2$ produce a dither pickoff signal with less error, which in turn allows for production of a more accurate gyro output signal.

DETAILED DESCRIPTION OF THE INVENTION

Figure 1:
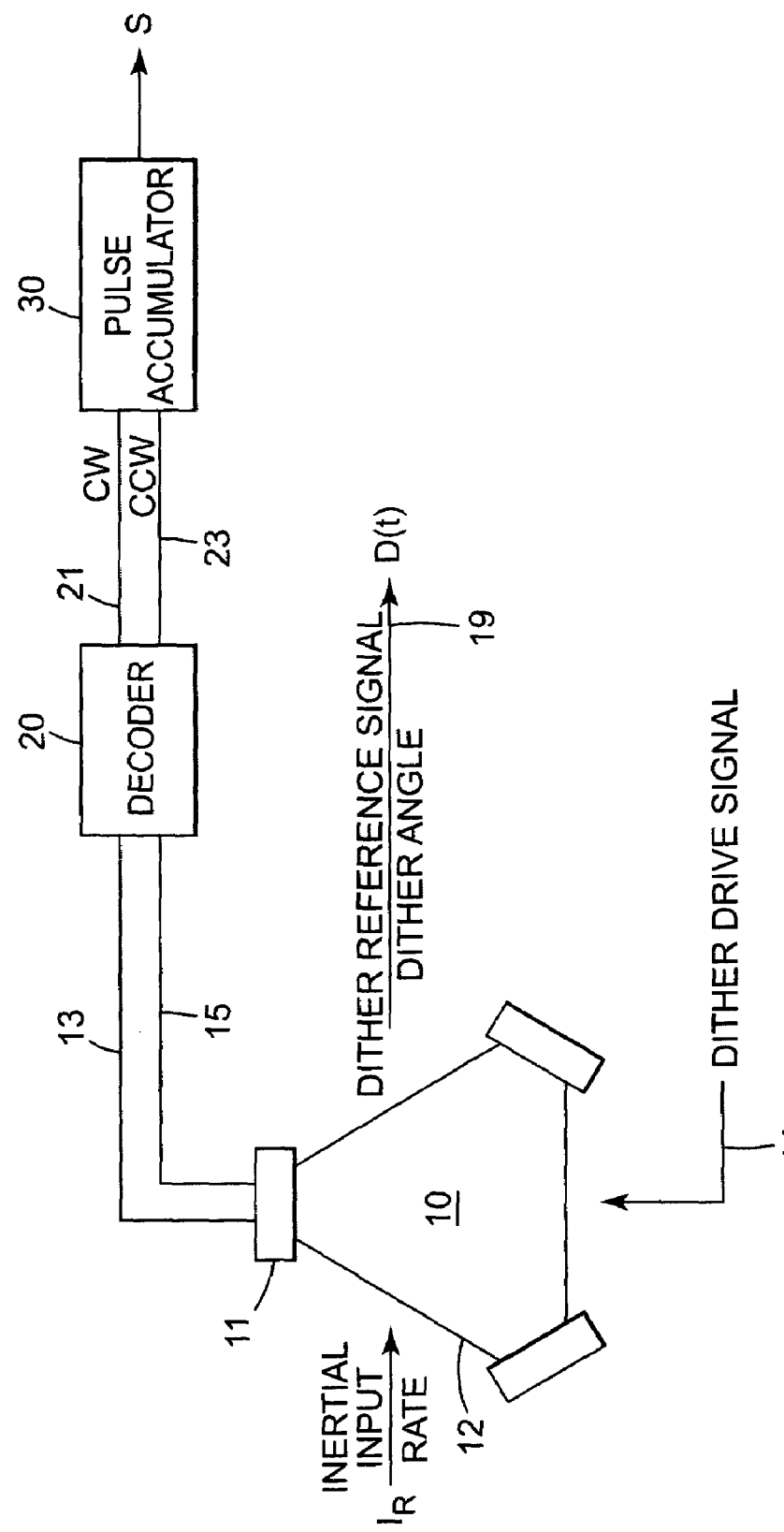
FIG. 1 is a block diagram of a prior art gyro with a dither stripper.
Figure 2:
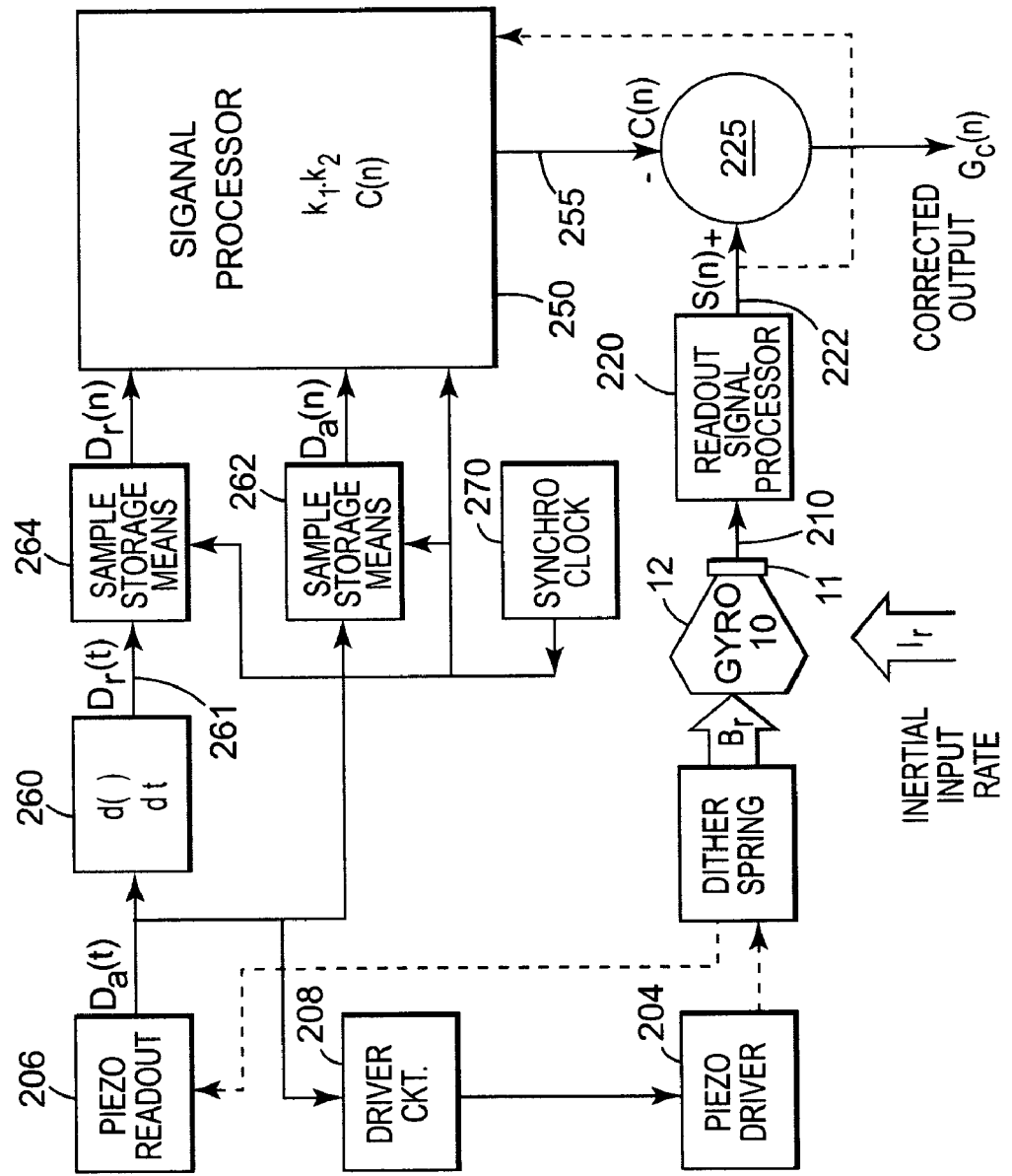
FIG. 2 is a block diagram of another prior art gyro with a dither stripper.
Figure 2A:
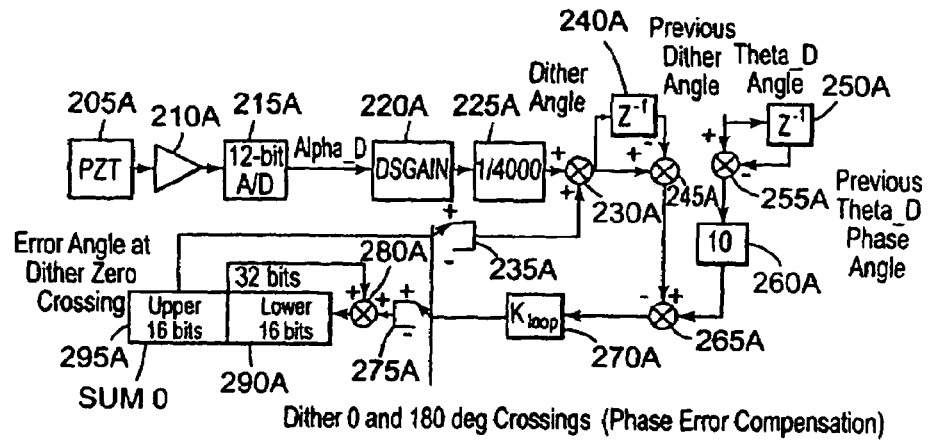
FIG. 2A is a block diagram of a prior art control loop implemented in the dither stripper to provide phase error ($\Delta\theta$) compensation.
Figure 2B:
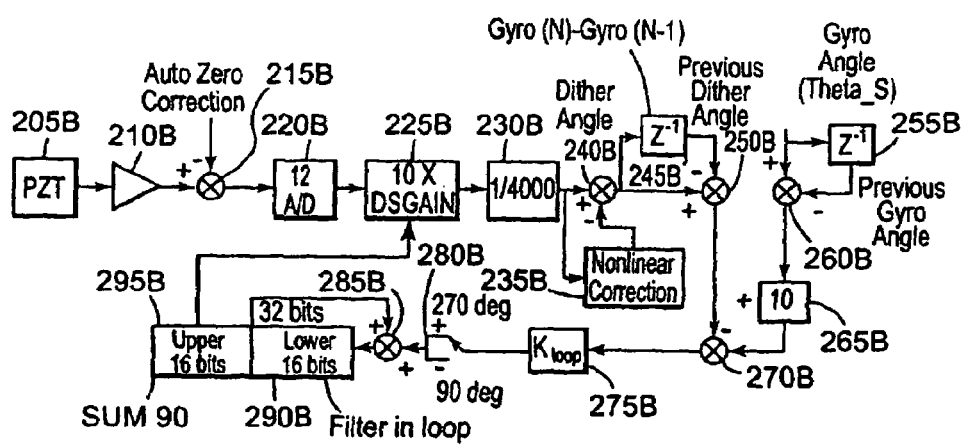
FIG. 2B is a block diagram of a prior art control loop to correct for offset.
Figure 3:
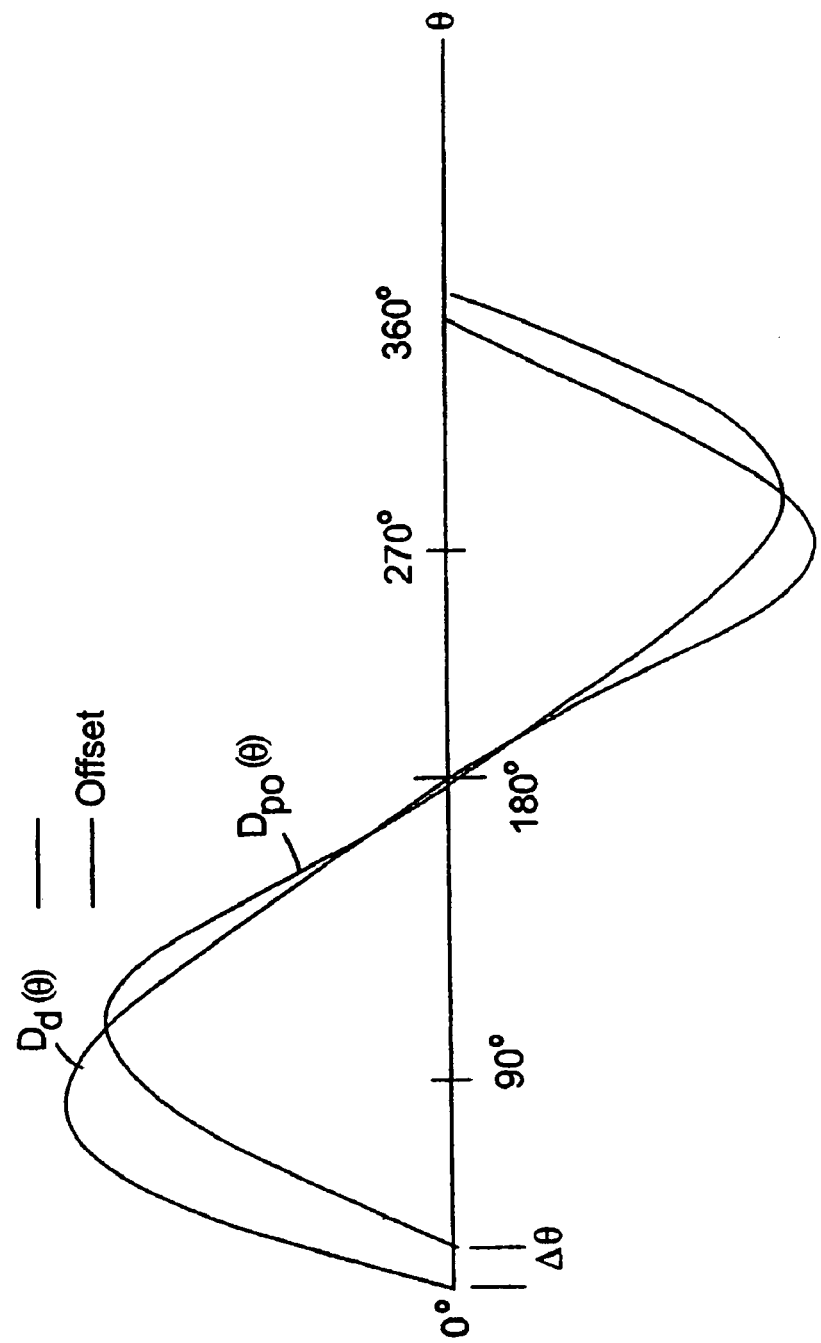
FIG. 3 is a graph of a dither input signal and a corresponding dither pickoff signal.
Figure 4:
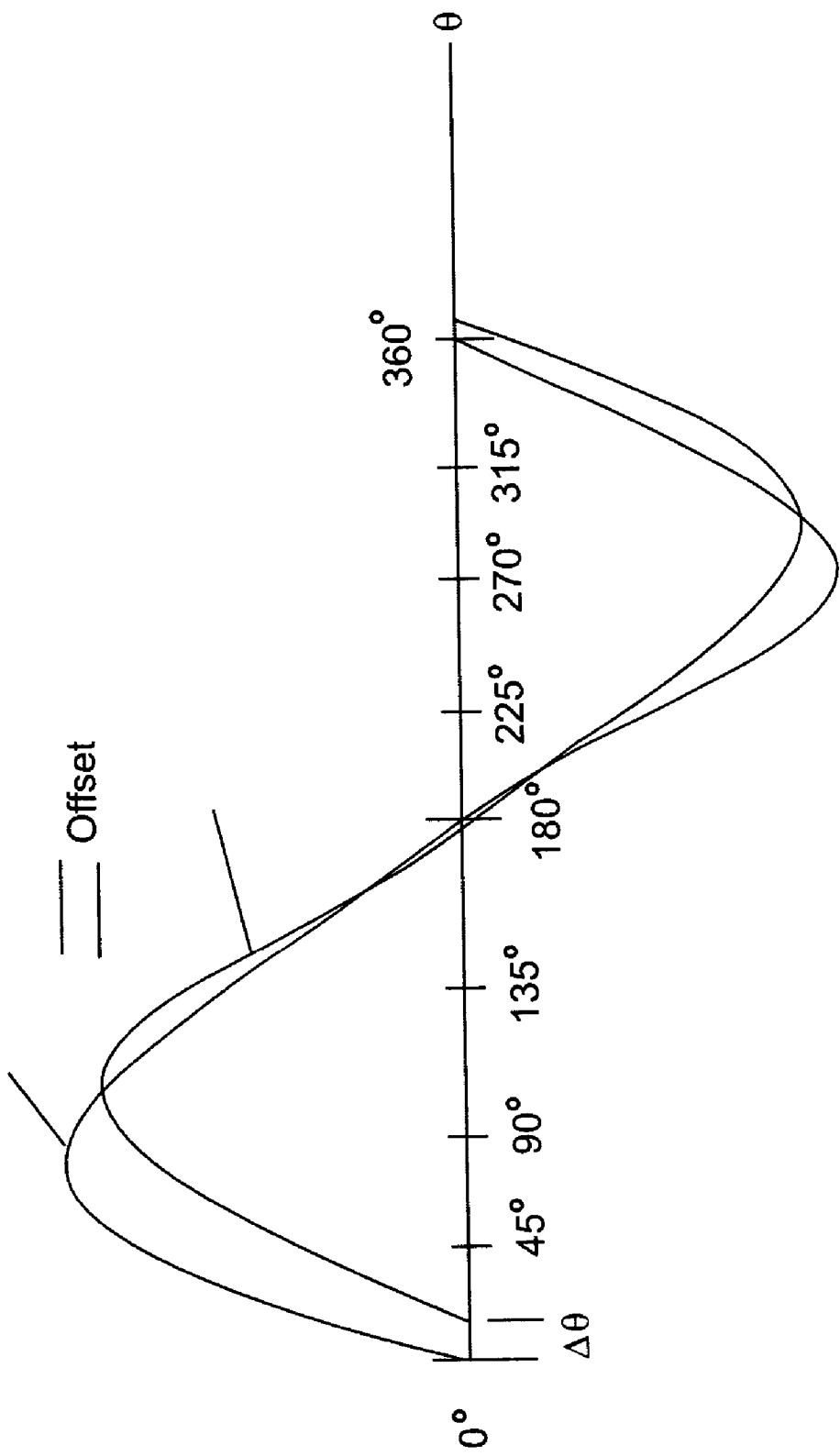
FIG. 4 is a graph of sampling times as taken by the present invention.

Referring now to FIG. 4 thereshown is a graph depicting the dither input 301A signal and the dither pickoff signal 302A. As shown, samples of the dither pickoff signal are taken at 0°, 45°, 90°, 135°, 180°, 225°, 270° and 315°. Equivalently, the measurements could be taken in the time domain of every one-eighth of a cycle of the dither input signal.

The reason for sampling the dither pickoff signal at these angles relates to the value of the phase error and offset at these specific dither input angles. At a dither input angle of 0° with the input signal equal to zero, the dither pickoff signal should be zero as well. By determining the dither pickoff signal value at this point, the phase error and square error term can be determined. This is true as well at the dither input angle of 180°

At a dither input angle of 45°, the dither pickoff signal contains elements related to the phase error and the offset and a cubic error term. This is true also at 135°, 225° and 315°.

At a dither input angle of 90°, the dither pickoff signal contains elements related to Gain, square error term and the cubic error term. This is also true at 270°.

Measurements taken at the selected phase angles are then subtracted and added to a sum. For example, measurements at 180° are subtracted from measurements during the same cycle at 0° and the difference is added to a running total called Sum0. This can be expressed as:

$$\text{Sum0} = \sum_{i=1}^{8} p_i(180°) - p_i(0°) \tag{7}$$

Measurements at 270° are subtracted from measurements at 90° and added to a running total called Sum90. This can be expressed as:

$$\text{Sum90} = \sum_{i=1}^{8} p_i(270°) - p_i(90°) \tag{8}$$

Measurements at 135° are subtracted from measurements at 45° and added to a running total called Sum45. Measurements at 315° are subtracted from measurements at 225° and also added to Sum45.

$$\text{Sum45} = \sum_{i=1}^{8} (p_i(45°) - p_i(135°)) + (p_i(225°) - p_i(315°)) \tag{9}$$

The following equations are then used in correction of the output signal from the laser gyro:

$$\text{Phase Error} = \sum_{i=1}^{8} \text{Sum0} \tag{10}$$

$$\text{DSGAIN(Offset)} = \sum_{i=1}^{8} \text{Sum45} - \text{Sum90} - 2*\text{Sum0} \tag{11}$$

$$\text{Cubic} = \sum_{i=1}^{8} \text{Sum90} - \text{Sum45} + 2*\text{Sum0} \tag{12}$$

Figure 5:
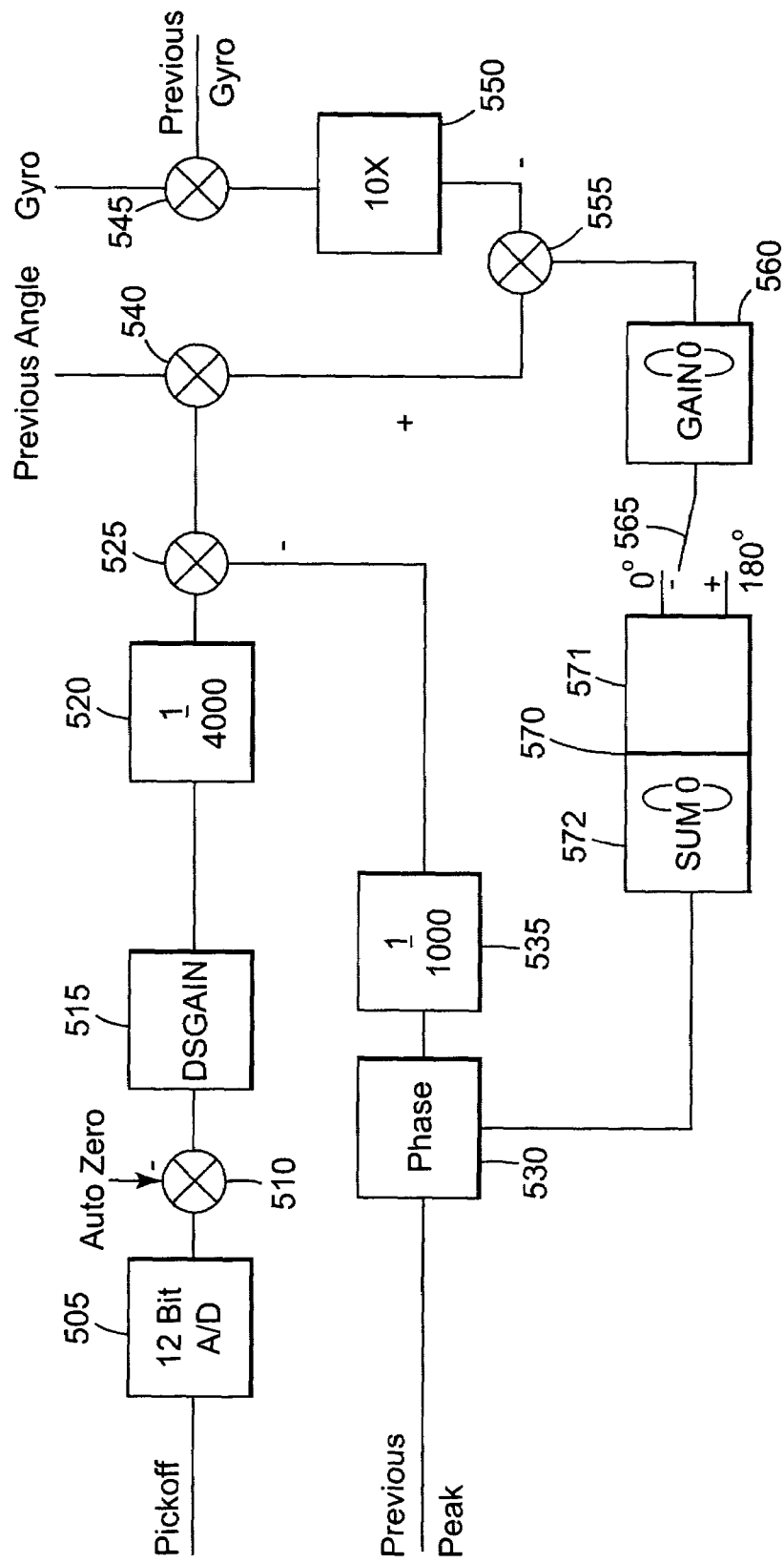
FIG. 5 is a block diagram of a phase correction loop of the present invention.

Referring now to FIG. 5, thereshown is a system implementation of the Sum0 loop. A dither pickoff signal is converted from an analog to digital signal in block 505. At summer 510, the Auto Zero signal is added to the digitized dither pickoff signal. The Auto Zero signal is the average of dither pickoff values at 90° and 270° in the dither cycle (this provides the measure of the bias in the dither amplitude). Next the summed pickoff value is multiplied by the DSGAIN constant in block 515 and then divided by a constant (here 4000) in block 520 to produce a conditioned pickoff value.

DSGAIN is determined as follows:

$$DSGAIN=2(\text{Sum45})-(\text{Sum90})$$

The DSGAIN is a factor that the pickoff value must be multiplied by to equal remove the offset identified in the previous pass through the loop from the dither pickoff signal.

In parallel with the process described in the previous paragraph, the processor multiplies a value representative of the previous dither signal peak by a phase signal in block 530 to produce a phase adjusted previous peak value. The phase value is a function of the Sum0 value produced in block 572. Next, the phase adjusted previous peak value is then scaled by dividing by 1000.

Next, the phase adjusted previous peak value is subtracted from the conditioned pickoff signal at summer 525. The resulting phase adjusted pickoff value is then added to the previous angle value at summer 540.

In parallel with this, a gyro value is summed with a previous gyro value at summer 545. The sum is then multiplied by 10 at block 550 and the result subtracted from the sum produced by summer 540. The resulting sum is then the multiplied by the Gain0 Value. The Gain0 Value is a gain value based upon loop requirements of frequency response and filtering, and is the gain value for the loop at 0 phase angle. The output of block 560 is then added to the stored Sum0 value in 571, 572 if the current dither cycle angle is 180° and is subtracted from the stored value in 571, 572 if the current dither cycle angle is 0° due to switch 565.

Figure 6:
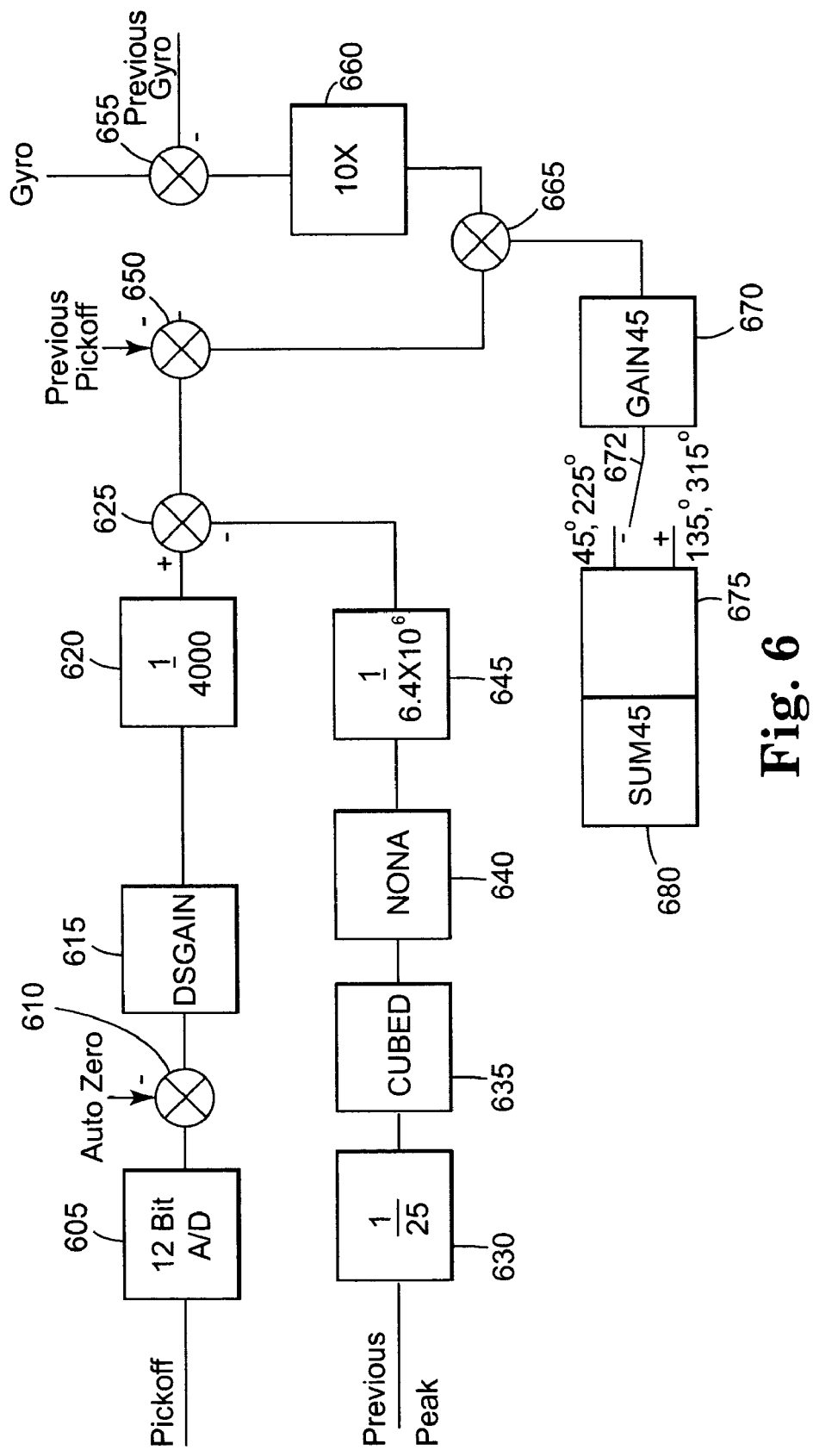
FIG. 6 is a block diagram of a second phase correction loop of the present invention.

Referring now to FIG. 6, thereshown is a Sum45 loop for dealing with the corrections at 45°. An analog pickoff signal is digitized through A/D converter 605. The digitized pickoff signal has the auto zero value subtracted at summer 610. The result is then multiplied by the DSGAIN value at block 615 and divided by 4000 at block 620.

In parallel, the previous peak value is divided by 25 at block 630 then the result is cubed at block 635. The result is then multiplied by NONA at block 640 and then is divided by $6.4 \times 10^6$. The output of block 645 is subtracted from the output of block 620 at summer 625. The previous pickoff value is then subtracted at summer 650 from the sum produced by summer 625.

At summer 655, the previous gyro signal is subtracted from the current gyro signal and the sum is then multiplied by 10 at block 660. The output of block 660 is then added to the output of block 650 at summer 665. The output of summer 665 is then multiplied by the Gain45 value in block 670. This value is then added to the stored Sum45 value in 675, 680 if the current dither cycle angle is 135° or 315° and is subtracted from the stored Sum45 value when the current dither cycle angle is 45° or 225° due to switch 672.

Figure 7:
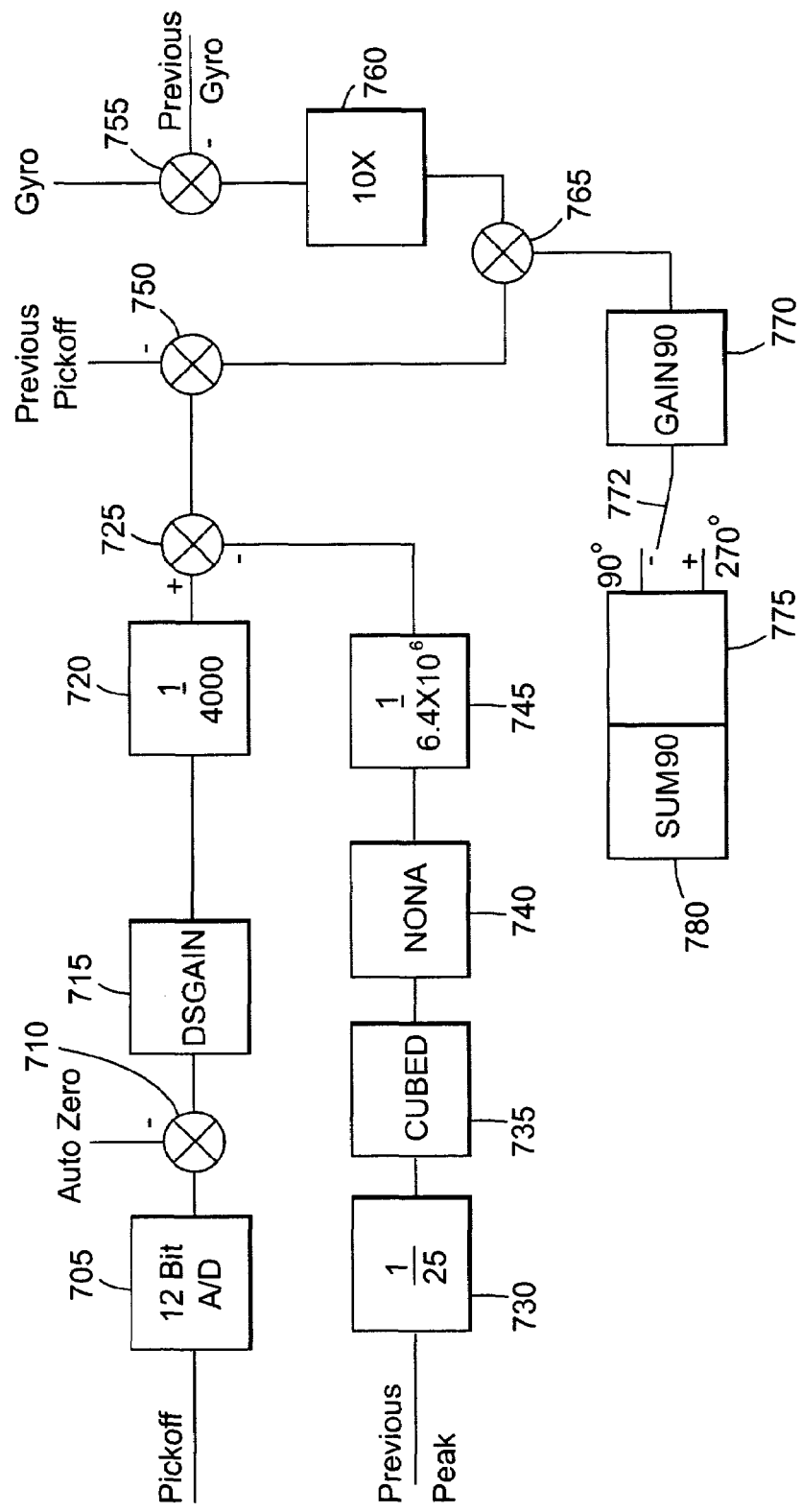
FIG. 7 is a block diagram of an offset correction loop of the present invention.

Referring now to FIG. 7, thereshown is the loop for determining the Sum90 value. This process, in a preferred embodiment is virtually identical to the loop of FIG. 6, except that the measurements are made at 90° and 180° in the dither cycle and the switch 772 operates at 90° and 180°.

Based on the new measurements, the following factors can be calculated.

Phase error=Sum0

$DSGAIN(OFFSET) = Sum45 - Sum90$

Cubic=2Sum90−Sum45+2Sum0

These factors are then used in the calculation of the constants $k_1$ and $k_2$ for use in the calculation of a corrected dither stripped angular rotation rate as follows. ((−) indicates that the sample is subtracted). Sum(0) is the sum obtained by accumulating the samples at the 0 and (−)180 crossings. Sum(45) is the sum obtained by accumulating the samples at the 45, 135 and (−)225, (−) 325 crossings. Sum(90) is the sum obtained by accumulating the samples at the 90 and (−)270 crossings.

The equations for the sums are derived as follows:

Sum(0)=Phase (at 0)+(−)Phase (at 180)=2×Phase (0)

$\text{Sum}(45) = DSGAIN/(2)^{0.5} + \text{Cubic}^*(2)^{0.5}/4 + \text{Phase}^*(2)^{0.5}$ at 45 sample $DSGAIN/(2)^{0.5} + \text{Cubic}^*(2)^{0.5}/4 - \text{Phase}^*(2)^{0.5}$ at 135 sample $-(DSGAIN/(2)^{0.5} + \text{Cubic}^*(2)^{0.5}/4 + \text{Phase}^*(2)^{0.5})$ at 225 sample $-(DSGAIN/(2)^{0.5} + \text{Cubic}^*(2)^{0.5}/4 - \text{Phase}^*(2)^{0.5})$ at 315 sample Sum(90)=$DSGAIN+\text{Cubic}+\text{Phase}^*(2)^{0.5}$ at 90 sample $DSGAIN+\text{Cubic}-\text{Phase}^*(2)^{0.5}$ at 180 sample Each of these sums is converted to a single sample value: Sum(0) is divided by 2; Sum(45) is divided by 4; and Sum(90) is divided by 2.

1) Sum(0)=Phase
2) Sum(45)=DSGAIN*$(2)^{0.5}$/2+Cubic*$(2)^{0.5}$/4+0 (note that the Phase samples all cancel to zero)
3) Sum(90)=DSGAIN+Cubic (note that the Phase samples all cancel to zero)

Therefore: (By simple algebra of these three equations)

Phase error=Sum(0)

$DSGAIN = 2*(2)^{0.5}*\text{Sum}(45) - \text{Sum}(90)$

Cubic=2*Sum(90)−2*$(2)^{0.5}$*Sum(45)

These three terms are calculated by the loops. This calculates the value of the Phase error, the DSGAIN and the cubic term. This adds substantially to the accuracy of the pickoff compensation. The present system has a value of the cubic loaded into every gyro memory. This single value has been adequate for most applications. However, the value varies from gyro to gyro and over temperature. By implementing these loops the value for each gyro is determined constantly so that it is tracked with temperature.

In some isolated cases the value of the cubic term is different for the positive and negative outputs. This difference is a measure of construction quality and probably would be used as a production screen. For example: If greater than some value the unit would be rejected or used in a lower accuracy system. It is possible to add additional loops and separate the samples at 45 and 135 from the two at 215 and 315. This is possible but adds a lot of complexity to the loops. A second (and preferred method) is to leave the three loops in place as described above. To this a term is calculated as the filtered value of the 35 and 135 samples and the 225 and 315 samples as a separate filtered value. (These values are not determined from an integrator but from a heavy filtered sum.)

Sum(45&135)=$2^{1/2}$*$DSGAIN+\text{Cubic}*2^{1/2}/2$

Sum(225&315)=$2^{1/2}$*$DSGAIN+\text{Cubic}*2^{1/2}/2$

Since the value of DSGAIN is found by the active loops, the separate values of the Cubic (Positive) and Cubic (Negative) are easily calculated. The difference between these two values can be either used in the dither stripper calculations or used as a production screen.

What is claimed is:

1. A method of providing a corrected dither pickoff signal in a ring laser gyro having a periodic dither input signal, comprising the steps of:
   a) measuring a dither pickoff signal value at eight times during the period of the dither input signal; and
   b) determining a correction factor by which the dither pickoff signal value is multiplied to produce a corrected dither pickoff signal, the correction factor being a function of the dither pickoff signals measured in a past dither input signal cycle.

2. The method of claim 1, wherein the dither input signal is a sinusoid.

3. The method of claim 1, wherein the measuring occurs at every 45° of the dither input signal period.

4. A method for correction of a dither pickoff signal in a laser gyro using a dither motor and a dither input signal, the method comprising the steps of:
   a) measuring a first set of the dither pickoff signal at points during the dither input signal period during which gain and phase error are determined;
   b) measuring a second set of the dither pickoff signals during the dither input signal period during which a cubic error signal is present; and
   c) determining a correction factor by which the dither pickoff signal value is multiplied to produce a corrected dither pickoff signal, the correction factor being a function of the first set and the second set.

5. The method of claim 4, wherein the dither input signal is a sinusoid.

6. The method of claim 4, wherein the measuring occurs at every 45° of the dither input signal period.

* * * * *